(12) United States Patent
Vendrow

(10) Patent No.: US 9,729,827 B2
(45) Date of Patent: *Aug. 8, 2017

(54) SYSTEM AND METHOD FOR DYNAMICALLY SELECTING NETWORKED CAMERAS IN A VIDEO CONFERENCE

(71) Applicant: RingCentral, Inc., San Mateo, CA (US)

(72) Inventor: Vlad Vendrow, Redwood City, CA (US)

(73) Assignee: RINGCENTRAL, INC., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/962,282

(22) Filed: Dec. 8, 2015

(65) Prior Publication Data

US 2016/0227168 A1    Aug. 4, 2016

Related U.S. Application Data

(63) Continuation of application No. 14/610,164, filed on Jan. 30, 2015, now Pat. No. 9,237,307.

(51) Int. Cl.
*H04N 7/14* (2006.01)
*H04N 7/15* (2006.01)

(52) U.S. Cl.
CPC .................. *H04N 7/152* (2013.01)

(58) Field of Classification Search
CPC ............... G09B 5/067; G09B 5/14; H04M 3/56–3/569; H04M 2203/50–2203/509
USPC ............... 348/14.01–14.16; 370/259–271, 370/351–357; 379/201.01, 379/202.01–207.01; 709/201–207, 709/217–248

See application file for complete search history.

(56) References Cited

U.S. PATENT DOCUMENTS

| | | | |
|---|---|---|---|
| 6,680,745 B2 | 1/2004 | Center et al. | |
| 6,727,935 B1 | 4/2004 | Allen et al. | |
| 6,844,893 B1 | 1/2005 | Miller et al. | |
| 7,133,062 B2 | 11/2006 | Castles et al. | |
| 7,209,160 B2 | 4/2007 | McNelley et al. | |
| 8,107,645 B2 | 1/2012 | Posa et al. | |
| 8,289,363 B2 * | 10/2012 | Buckler ................ | H04N 7/15 348/14.08 |
| 8,339,459 B2 | 12/2012 | Zhang et al. | |

(Continued)

*Primary Examiner* — Hemant Patel
(74) *Attorney, Agent, or Firm* — Finnegan, Henderson, Farabow, Garrett & Dunner LLP

(57) ABSTRACT

Systems and methods are provided for dynamically selecting one or more networked cameras for providing real-time camera feeds to a video conference. The systems and methods may include identifying one or more networked cameras associated with an area of a conference participant. A server may analyze real-time camera feeds from the identified cameras, and select a video feed having a view of the participant. The server may provide the selected feed to the video conference via a conference bridge, and continue monitoring camera feeds of cameras associated with the participant's area for another camera feed having a better view of the participant. Networked cameras may include fixed and mobile cameras owned and operated by individuals that are not associated with the participant, but who have registered their cameras with the server for use in video conferences.

20 Claims, 5 Drawing Sheets

(56) References Cited

U.S. PATENT DOCUMENTS

| | | | |
|---|---|---|---|
| 8,350,908 B2* | 1/2013 | Morris | G06K 9/00295 |
| | | | 348/143 |
| 8,358,342 B2 | 1/2013 | Park | |
| 8,477,174 B2* | 7/2013 | Michaelis | H04N 7/147 |
| | | | 348/14.08 |
| 8,659,637 B2 | 2/2014 | De Beer et al. | |
| 8,736,660 B2 | 5/2014 | Rosenberg | |
| 8,982,177 B2* | 3/2015 | Modai | H04N 7/15 |
| | | | 297/135 |
| 9,237,307 B1* | 1/2016 | Vendrow | H04N 7/152 |
| 2012/0293606 A1* | 11/2012 | Watson | H04N 5/232 |
| | | | 348/14.16 |
| 2013/0328997 A1 | 12/2013 | Desai | |
| 2015/0062284 A1* | 3/2015 | Rangan | H04N 7/15 |
| | | | 348/14.08 |

* cited by examiner

SYSTEM AND METHOD FOR DYNAMICALLY SELECTING NETWORKED CAMERAS IN A VIDEO CONFERENCE This application is a continuation of U.S. patent application Ser. No. 14/610,164, filed Jan. 30, 2015, which is incorporated herein by reference in its entirety.

FIELD

The present disclosure relates to video conferencing, and more specifically to dynamically selecting a networked camera feed for a video conference.

BACKGROUND

Cameras have become ubiquitous. In recent years, camera and networking technologies have advanced greatly while dropping in cost, making small robust, and cheap networked cameras available to consumers in many forms. Today, cameras with streaming capabilities such as security cameras, dash cams, mobile device cameras, wearable devices such as Google Glass™, etc. can capture real-time video and/or audio content, and stream the video and/or audio content in private or public networks. At any given time, many devices with these capabilities surround us in public settings, enabling the possibility of providing video camera streams with multiple views of an individual.

SUMMARY

The present disclosure arises from the realization that many of the available camera streams are underused or unused. For example, many security cameras and vehicle dash cameras continuously record video, but the owner or operator usually does not check the video stream until an event occurs. Furthermore, many individuals carry their mobile electronic devices such as smartphones everywhere they go, yet rarely or only periodically use the mobile device's camera. Additionally, recent wearable cameras such as Google Glass™ place more cameras on individuals and in the public every day. Indeed, the amount of untapped resources grows continuously, in an already robust infrastructure of stationary and mobile cameras.

Advances in camera technologies have also driven advances in conferencing technologies. Current video conferencing systems enable conference participants in different time zones, countries, and even hemispheres to interact in real-time. But video conferencing systems traditionally require the participants to be in front of a video conferencing camera, or to hold a camera up to their face during the entire conference.

A method of utilizing unused and underused networked cameras to improve video conference call experience is disclosed. Disclosed example embodiments provide methods and systems for dynamically selecting networked cameras having the ability to capture audio and/or video data associated with an area proximate to a conference call participant so as to transmit audio and/or video data of the participant, for providing a camera feed of the participant in a video conference.

Consistent with an embodiment disclosed herein, a computer-implemented method for selecting a camera feed for a video conference is provided. The method comprises determining a first area of a participant in the video conference, receiving registration information for a plurality of video cameras associated with a plurality of subscribers, identifying, from the plurality of cameras, a first set of cameras associated with the first area; analyzing a first plurality of real-time camera feeds from the first set of cameras, and selecting, based on the analysis, a first camera feed of the first plurality of real-time camera feeds, the selected first camera feed containing a view of the participant.

Consistent with another disclosed embodiment, a system for selecting a camera feed for a video conference is provided. The system comprises one or more memories having stored thereon computer-executable instructions, and one or more processors configured to execute the stored instructions. When the stored instructions are executed, the one or more processors can determine a first area of a participant in the video conference, receiving registration information for a plurality of video cameras associated with a plurality of subscribers, identify, from the plurality of cameras, a first set of cameras associated with the first area, analyze a first plurality of real-time camera feeds from the first set of cameras, and select, based on the analysis, a first camera feed of the first plurality of real-time camera feeds, the selected first camera feed containing a view of the participant.

Consistent with other disclosed embodiments, non-transitory computer-readable storage media can store program instructions, which are executed by at least one processor device and perform any of the methods described herein.

The foregoing general description and the following detailed description are explanatory only and are not restrictive of the claims.

BRIEF DESCRIPTION OF THE DRAWINGS

The accompanying drawings, which are incorporated in and constitute a part of this disclosure, illustrate several embodiments and, together with the description, serve to explain the disclosed principles. In the drawings.

DESCRIPTION OF THE EMBODIMENTS

Figure 1:
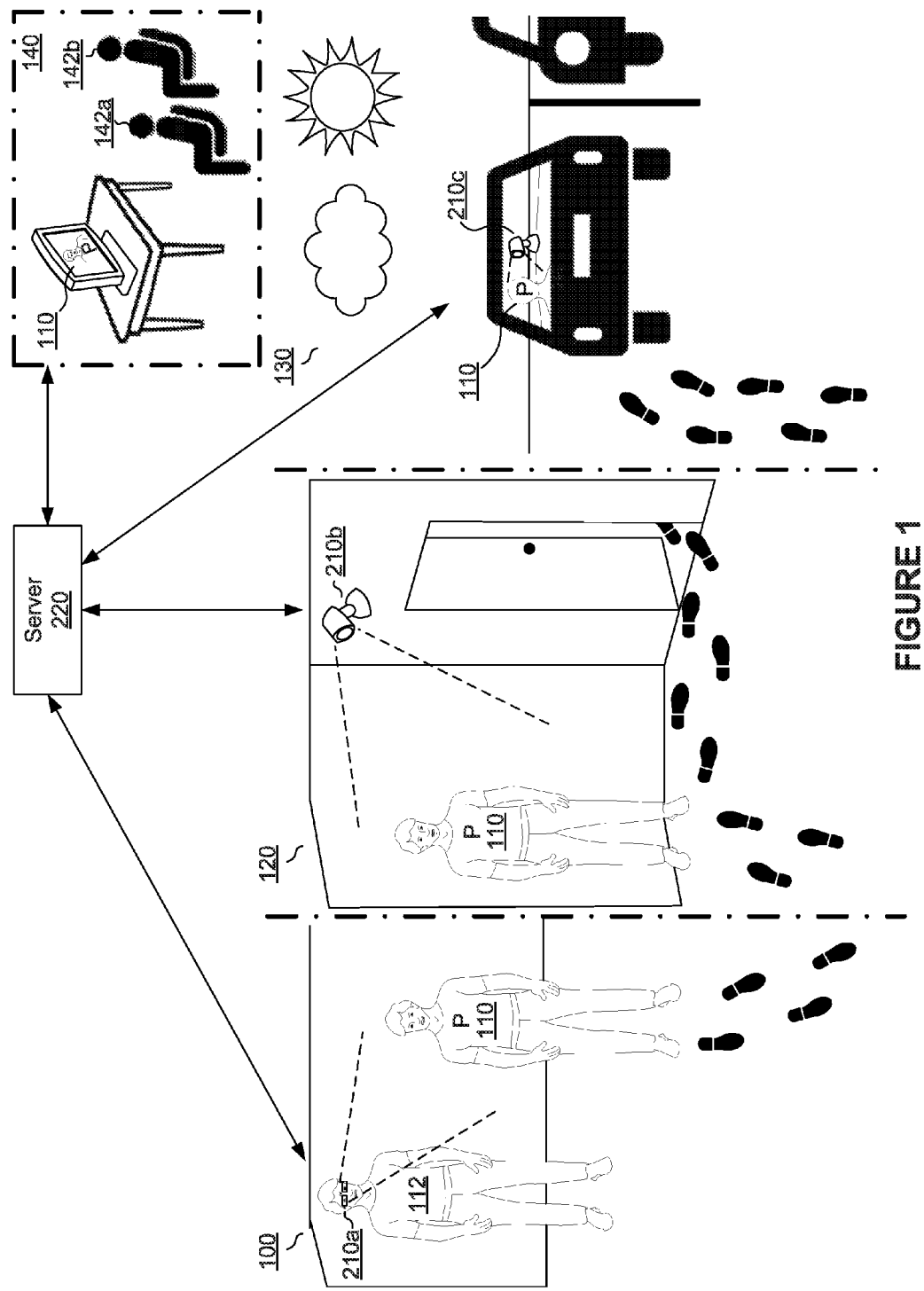
FIG. 1 is an illustration of an example of a system and method of dynamically selecting networked cameras in a video conference, consistent with disclosed embodiments.

The disclosed embodiments concern selecting networked cameras for a video conference. In some embodiments, a server having one or more processors can receive a plurality of video feeds from cameras associated with an area of a conference call participant. The cameras include devices owned and operated by the participant, as well as networked cameras owned and operated by other entities, such as security cameras in a facility where the participant is located, mobile devices of other individuals (including complete strangers) walking nearby the participant, or outdoor surveillance cameras with a clear view of the participant, regardless of the distance. The server can maintain a database of the networked cameras, which are pre-registered by the camera owners and operators.

In some embodiments, the networked camera owners and operators and the participant are not aware of one another. That is, there could be no preexisting relationship or affinity between the networked camera owners and operators and the participant, and thus the owners and operators may not be aware of their cameras are streaming video of the participant. The owners and operators may only know that their camera(s) are registered for use by the one or more processors. In some embodiments, owners and operators can receive compensation for registering their networked camera(s), and granting the server access to their subscribed camera(s).

As an advantage of the disclosed embodiments, an individual can participate in a video conference without having to hold a camera throughout the conference, or remain stationary in front of a video conference camera. Instead, the individual can move freely between different areas during the video conference, and the server can provide video feeds from networked cameras having suitable real-time video of the participant to one or more servers, devices, or conference bridges associated with the video conference. Thus, without even needing a camera of his own, the participant can participate in a video conference relying upon networked cameras registered by subscribers. As the participant moves about an area, the server dynamically selects cameras associated with an area of the participant, that potentially provide a view of the participant, based on a continuous comparison of real-time camera feeds from the cameras, to provide the video conference with a camera feed having a view of the participant. In some embodiments, the server monitors an area in the vicinity of a location of the participant, and determines when to analyze feeds from additional cameras based on changes in the monitored area. In some embodiments, if the participant enters an area where there are no networked cameras available, the server can alert the participant of the lack in coverage, and allow or activate a camera owned by the participant to continue the video feed, such as a mobile device camera, a dash cam, a home security camera, etc. In some embodiments, the server may also have a map of networked cameras, and select one or more video feeds from networked cameras based on the participant's current monitored movement pattern (e.g., based on GPS coordinates), based on the participant's historic movement patterns, or based on a calendar schedule indicating the participant's planned areas.

Other features and advantages of the present embodiments are discussed in further detail below with respect to the figures.

FIG. 1 is an illustration of an example of a system and method of dynamically selecting networked cameras in a video conference. In the presently described example, a participant ("P") 110 is engaged in a video conference session with one or more other participants 142a, 142b at a remote location 140. In this example, during the video conference participant 110 is also attending an event such as a convention. Upon initiating a video conference, a server 220 determines a first area 100 of participant 110 associated with a determined location of participant 110 and the proximate vicinity around the determined location. At the first area 100, one or more bystanders 112 such as convention attendee may be present having mobile or wearable camera devices.

As shown in FIG. 1, bystander 112 is wearing a wearable camera 210a in the form of video camera glasses such as the Google Glass™ device. Server 220 identifies wearable camera 210a as a networked camera associated with participant's 110 area, and begins analyzing the real-time camera feed from wearable camera 210a. If participant 110 is within wearable camera 210a's field of view (denoted by dashed lines), and if the camera feed includes a clear view of participant 110's face, server 220 provides the camera feed to remote location 140 for use in the video conference with other participants 142a and 142b.

In this example, bystander 112 and participant 110 may not know each other, and may not even interact with one another while wearable camera 210a streams a real-time camera feed to the server 220 for analysis and for providing to devices associated with the video conference. Bystander 112 may only be aware of his wearable camera 210a being registered with server 220 (or a service provider associated with server 220), and that the camera feed may be analyzed and provided to other individuals. In some embodiments, bystander 112 can receive compensation for registering wearable camera 210a with server 220 and for using wearable camera 210a for the video conference, such as monetary compensation or an account credit from a service provider associated with server 220. In some embodiments, bystander 112 can receive compensation up-front, upon registering his camera device with server 220, in return for granting server 220 access to the video and/or audio feed from wearable camera 210a. In other embodiments, bystander 112 may receive compensation based on an amount or length of camera feed that server 220 receives and uses from wearable camera 210a during a given period of time.

During the video conference, participant 110 can move around the area, and eventually exit wearable camera 210a's field of view. For example, participant 110 can walk to another area of the convention at a second area 120, where bystander 112 is not present. Server 220 determines that wearable camera 210a's camera feed no longer includes an optimal view of participant 110, and server 220 searches for a new optimal camera feed.

As discussed herein, a camera feed having an "optimal view" is a camera feed that includes, for example, a view of participant 110 that is of a greater size and/or resolution than other camera feeds analyzed within a particular period of time. For example, the term "optimal view" refers to a video or image that includes a highest objectively evaluated digital representation of participant 110 based on, for example, a statistical ranking or scoring of received camera feeds, the optimal view having the highest ranking or score compared to other camera feeds at the time of evaluation. In some embodiments, server 220 performs a recognition analysis to evaluate camera feeds against a pre-stored image of participant 110's face, and optionally also body, discussed in further detail below.

After identifying networked cameras in second area 120, server 220 analyzes a camera feed from a security camera such as fixed camera 210b. As shown in FIG. 1, participant 110 is within the field of view of fixed camera 210b, and therefore server 220 provides the camera feed from fixed camera 210b to remote location 140 for use in the video conference. Server 220 dynamically and seamlessly alternates camera feeds from wearable camera device 210a to fixed camera 210b, once server 220 determines that a new optimal feed is required based on participant 110's new area, or when server 220 determines that another networked camera feed in the current area provides a better view of participant 110.

Participant 110 can continue walking throughout the convention, and eventually exits the building into a parking lot. As participant 110 walks to his car, server 220 searches for networked cameras in a third area 130 associated with a third determined location. In some embodiments, server 220 can predict participant 110's next area based on historical data and/or heuristics. For example, if server 220 determines that participant 110 is walking toward a familiar networked camera such as participant 110's vehicle camera in his car, server 220 may assume that participant 110 will soon appear in vehicle camera 210c's field of view. Server 220 can begin analyzing vehicle camera 210c's camera feed, and provide the camera feed from vehicle camera 210c to the video conference at a time just prior to participant 110's expected arrival within vehicle camera 210c's field of view. In some embodiments, server 220 provides the camera feed to the video conference by forwarding the camera feed to conference bridge 252, which distributes the camera feed to one or more video conference devices 254a-d (shown in FIG. 2). In other embodiments, server 220 distributes the camera feed directly to video conference devices 254a-d. Server 220 analyzes one or more characteristics of participant 110's area such as direction vector, velocity, acceleration, and historical motion patterns to estimate a time and area where participant 110 will appear next, in order to predictively select the next camera feed for the video conference. In some embodiments, server 220 awaits confirmation that a predicted camera feed includes an optimal view of participant 110 before providing the camera feed to devices associated with the video conference.

In some embodiments, server 220 tracks participant 110 in the one or more camera feeds received for participant 110's area. In such embodiments, server 220 can employ one or more methods for tracking individuals in video feeds such as, for example, facial recognition, object motion tracking, and differentiating between different persons and objects in the video feeds. By tracking participant 110 throughout the video feed, server 220 can maintain a sufficient and focused view of participant 110 even in crowds of other bystanders. Additionally, tracking participant 110 can increase server 220's accuracy for predictively selecting camera feeds for the video conference.

In some embodiments, server 220 analyzes received real-time camera feeds, and selects a camera feed for the video conference. A camera feed can be selected based on a comparison of objective and statistical analysis results for each of the received camera feeds. For example, server 220 can compare landmarks and features of faces recognized in a camera feed, to a database of facial images of individuals registered with server 220, including participant 110. Based on the comparisons, server 220 can perform a dynamic probabilistic analysis to determine whether participant 110's face appears in at least one of the received camera feeds. Using a dynamic probabilistic analysis, server 220 can score and/or rank the camera feeds, to select a camera feed with a highest rank or score among the received camera feeds.

In some embodiments, participant 110 provides an image of themselves via their participant device 254 to server 220 at a time prior to the video conference or at the beginning of the video conference. Server 220 can identify features such as landmarks on participant 110's face and/or body, for use in subsequent analysis of received camera feeds. Landmarks can include, for example, facial features, facial dimensions, body shape, height, size, distinctive clothing or accessories, hairstyle shape, hair color, and any other quantifiable characteristics that can assist server 220 in later identifying participant 110 in a real-time analysis of received camera feeds.

In some embodiments, server 220 employs one or more facial recognition algorithms to quantify facial features of participant 110 such as, for example, a Principal Component Analysis using eigenfaces, a Linear Discriminate Analysis, an Elastic Bunch Graph Matching using the Fisherface algorithm, a Hidden Markov model, a Multi-linear Subspace Learning using tensor representation, and/or a neuronal motivated dynamic link matching. Server 220 can utilize one or more known techniques and algorithms for analyzing camera feeds, including geometric algorithms analyzing distinguishing features on participant 110's face and/or body, and search for similar features in the camera feeds. For example, facial recognition algorithms can extract landmark or features, from a reference image of participant 110's face. In some embodiments, a facial recognition algorithm can cause server 220 to analyze the relative position, size, and/or shape of the eyes, nose, cheekbones, and jaw, forehead, hairline, ears, or chin. Extracted features are then used to search for other image frames in received camera feed videos having matching features. In other embodiments, server 220 can utilize one or more statistical techniques and algorithms for analyzing camera feeds, which can convert a reference image of participant 110 and received camera feeds to statistical values, and compare the statistical values of the reference image and camera feeds to identify matches and eliminate variances. In some embodiments, server 220 also analyzes skin textures of participant 110 and individuals recognized in received camera feeds, to locate participant 110 in one or more camera feeds with increased accuracy. In such embodiments, server 220 can quantify unique patterns, lines, spots, or tattoos on participant 110, and perform a dynamic probabilistic analysis on received camera feeds to find matches.

In some embodiments, server 220 can recognize and identify multiple participants of the video conference in the same camera feed, including participant 110 and one or more additional participants located near participant 110. In such embodiments, server 220 can take one or more actions according to predetermined rules, settings, or preferences set by participant 110, other participants in the video conference, or an administrator associated with server 220. In some embodiments, server 220 can select one or more camera feeds for the video conference to provide views of all participants. In some embodiments, server 220 can prioritize the recognized participants, and provide one or more views to the video conference depending on a determined priority for each of the participants. For example, server 220 can rank the video conference participants based on an amount that each participant pays to have their image in the video conference. In this example, server 220 can assign a highest priority to the highest paying participant, and provide a view of the highest priority participant among the recognized participants. As another example, server 220 can rank recognized participants based on an analysis of the quality of a view of each participant. In this example, a participant who appears in multiple simultaneous camera feeds and fills at least a predetermined amount of the image frame can be ranked higher than another participant who only appears in a single camera feed and/or appears small in the image frame. In this example, server 220 can provide a view of a recognized participant that is more likely to appear continuously during the video conference due to the availability of multiple camera feeds having at least one optimal view of the participant.

In some embodiments, server 220 scans audio signals in received camera feeds and searches for participant 110's voice in the received camera feeds. Audio scanning can provide multiple advantages, including narrowing the pool of potential camera feeds to those with a relatively strong voice match, implying that participant 110 may appear in camera feeds in which participant 110's voice is louder and/or clearer. For example, server 220 can search for a voice match to participant 110's voice, and preliminarily select one or more camera feeds with an audio signal strength of participant's voice that is above a predetermined threshold. Server 220 can compare received camera feed audio signals to one or more previously recorded voice samples of participant 110, to facilitate the analysis.

In some embodiments, server 220 dynamically changes the audio source of participant 110's voice in the video conference, based on analysis of participant 110's voice from their participant device 254, compared to audio signals in received camera feeds. If one or more camera feeds contain participant 110's voice at a higher quality than the voice received from participant device 254 during the video conference, server 220 may dynamically change audio feeds, to provide audio data from a camera feed to the devices associated with the video conference. For example, participant 110's participant device 254 may malfunction, lose power, or disconnect from a network during the video conference, resulting in high static levels, interference, or lost audio data of participant 110's voice. Server 220 can dynamically switch audio feeds to provide audio data from one or more camera feeds, to maintain consistent voice quality during the video conference. In some embodiments, server 220 provides audio data extracted from a camera feed that is different from the camera feed providing video to the video conference. Prior to providing the audio data to the video conference, in some embodiments server 220 can process the audio data to filter background noise and remove other voices of bystanders.

Figure 2:
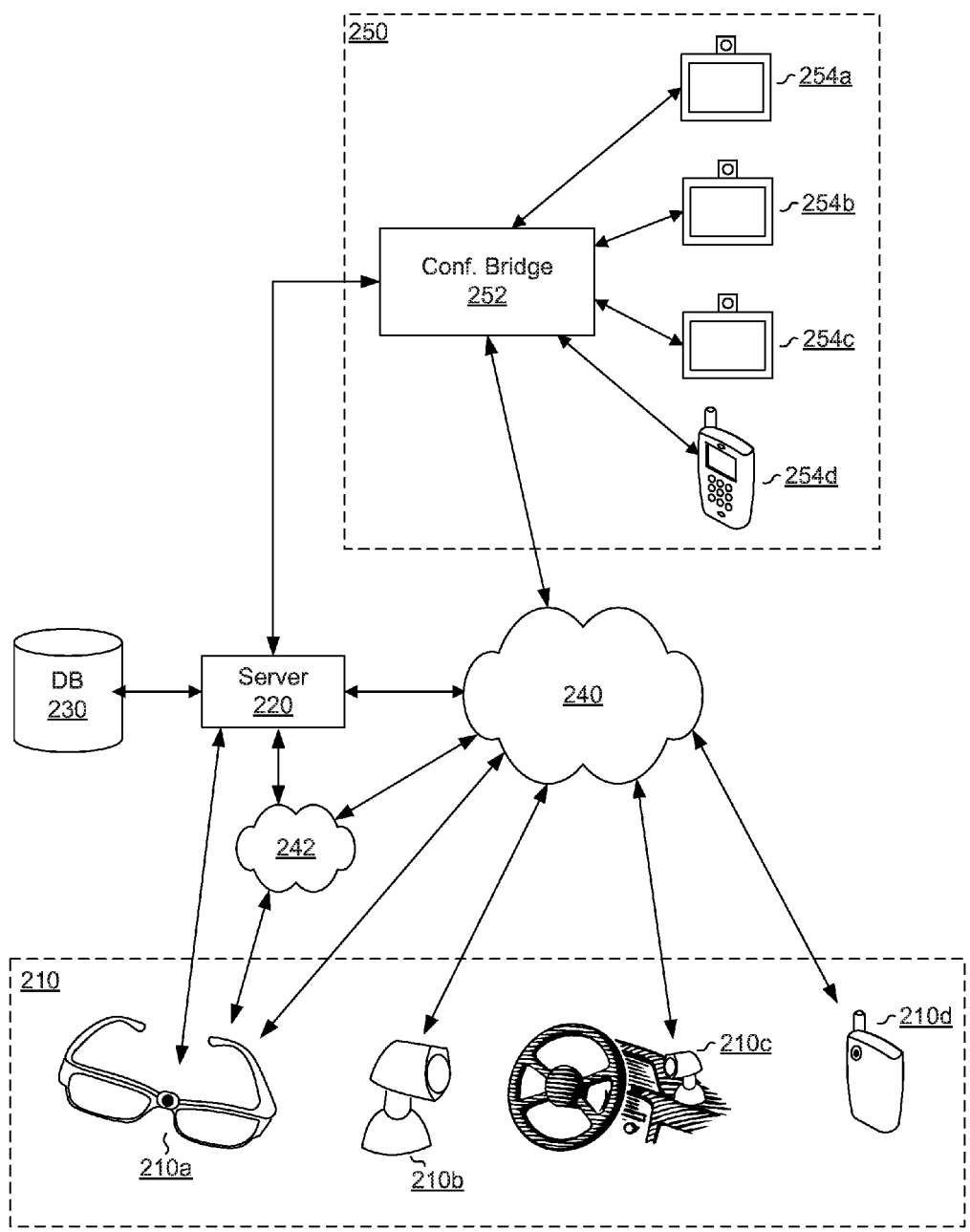
FIG. 2 is a diagram of a system for dynamically selecting cameras in a video conference, according to the disclosed embodiments.

FIG. 2 is a diagram of a system for dynamically selecting cameras in a video conference, consistent with disclosed embodiments. As shown in FIG. 2, system 200 includes one or more camera devices 210, server 220, one or more database 230, network 240, local network 242, and conference system 250. The components and arrangements shown in FIG. 2 are not intended to limit the disclosed example embodiment, as the system components used to implement the disclosed processes and features can vary.

Camera devices 210 can include one or more standalone cameras or devices having embedded cameras such as, for example, wearable camera 210a, fixed camera 210b, vehicle camera 210c, and mobile camera 210d. Wearable camera 210a can include a video camera embedded in a device configured to be attached to an individual, such as a pair of glasses including Google Glass™, a hat, a wristwatch, a smart watch, a necklace, a shirt button, an armband, or any other device wearable on a person's body. Fixed camera 210b can include a wired or wireless camera installed in a fixed location, such as a surveillance camera, a security camera, CCTV (closed-circuit television) is a TV system having one or more cameras, or a mounted web camera. Vehicle camera 210c can include a dash camera mounted on the dashboard of a car, or a camera attached to or embedded within a vehicle such as, for example, a boat, a plane, a car, a truck, a helicopter, a remote-controlled autonomous or semi-autonomous vehicle, an unmanned aerial vehicle (sometimes referred to as a drone), a flying aircraft, a blimp, or a satellite. Mobile camera 210d can include a camera attached to or embedded within a personal electronic device such as a cellular phone, smartphone, personal digital assistant, laptop computer, tablet computer, music player, or any other personal electronic device with sufficient processing and networking capabilities.

Server 220 (further described in connection with FIG. 3) can be a computer-based system including computer system components, desktop computers, workstations, tablets, hand held computing devices, memory devices, and/or internal network(s) connecting the components. Server 220 is specially configured to perform steps and functions of the disclosed embodiments, and in some embodiments server 220 includes specialized hardware for performing steps of the disclosed methods, such as, for example, a camera arbitration module (item 360 in FIG. 3).

Database 230 can include one or more physical or virtual storages in communication with server 220. In some embodiments, database 230 communicates with server 220 via a direct wired and/or wireless link. In other embodiments, database 230 communicates with server 220 via network 240 (data path not shown in figures). Database 230 is specially configured with specialized hardware and/or software configured to perform steps and functions of the disclosed embodiments.

Network 240 comprises any type of computer networking arrangement used to exchange data. For example, network 240 can be the Internet, a private data network, virtual private network using a public network, a satellite link, and/or other suitable connection(s) that enables system 200 to send and receive information between the components of system 200. Network 240 can also include a public switched telephone network ("PSTN") and/or a wireless network such as a cellular network, Wi-Fi network, or other known wireless network capable of bidirectional data transmission.

Local network 242 can comprise a small-scale wired or wireless network in the vicinity of one or more camera devices 210 such as a short range wireless network including Bluetooth™ or Wi-Fi, or a Local Area Network (LAN) or Wireless Local Area Network (WLAN). In some embodiments, one or more camera devices 210 can communicate with network 240 and/or server 220 via local network 242. In other embodiments, camera devices 210 can communicate with server 220 via a direct connection to network 240. In some embodiments, one or more camera devices 210 can communicate directly with server 220 via a direct wired or wireless link. It is appreciated that different camera devices 210 can communicate with server 220 via one or more of the above-described communication schemes depending on the capabilities of the camera device, the configuration of the camera device, and the availability of network 240 and/or local network 242 in the vicinity of the respective camera device 210.

Conference system 250 can comprise at least one conference bridge 252 and one or more video conference devices 254a-d. As shown in FIG. 2, conference system 250 includes multiple types of video conference devices. As a first example, video conference devices 254a-c comprises a video screen such as a television, computer monitor, or laptop computer screen, and a camera such as a web cam. As a second example, video conference device 254d comprises a mobile device such as a smartphone having display and video capture capabilities. In some embodiments, conference system 250 also includes devices without display or video capture capabilities, such as a cellular phones or a telephone (not shown). In some embodiments, video conference devices 254a-d are operated by one or more conference participants such as participant 110 and other participants 142. In the example illustrated in FIG. 1, participant 110 operates a smartphone such as video conference device 254*d*, and other participants 142*a* and 142*b* operate one or more video conference devices 254*a-c*.

Conference bridge 252 comprises a device or group of devices configured to connect video conference devices 254*a-d* in a conference call. Conference bridge 252 can comprise one or more processors for performing functions related to the disclosed methods, such as receiving camera feed data from server 220, and providing camera feeds to devices associated with the video conference, such as video conference devices 254*a-d*. In some embodiments, conference bridge 252 comprises a software module executed by one or more processors of server 220.

Figure 3:
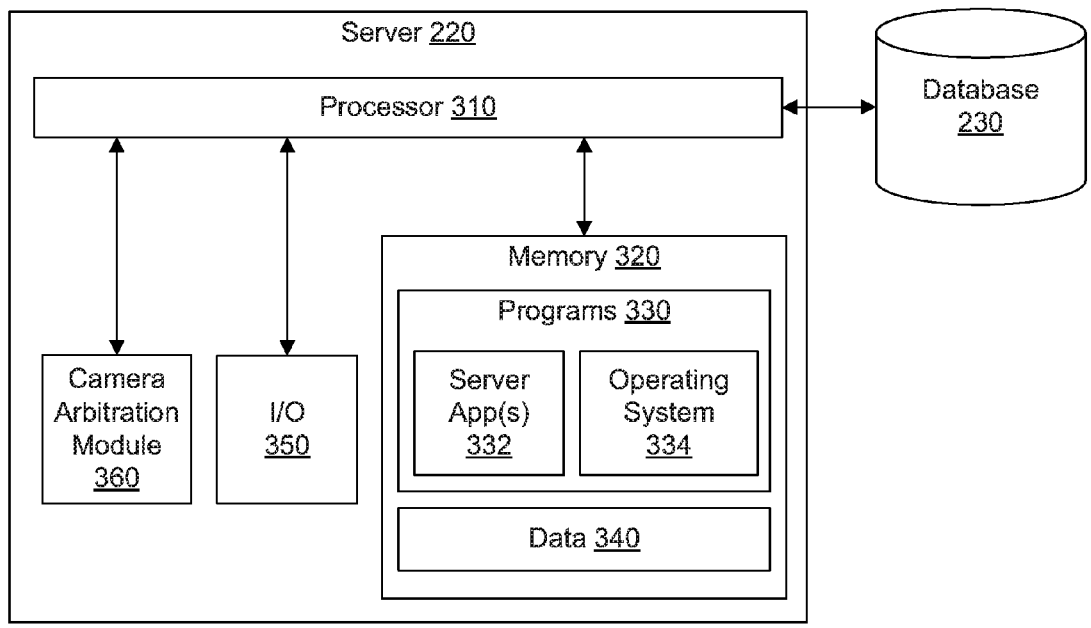
FIG. 3 is a diagram of an example of a server for dynamically selecting networked cameras, consistent with the disclosed embodiments.

FIG. 3 shows a diagram of an example of server 220, consistent with the disclosed embodiments. As shown, server 220 includes one or more processors 310, input/output ("I/O") devices 350, and one or more memories 320 storing programs 330 including, for example, server app(s) 332, operating system 334, and storing data 340, a database 230, and a camera arbitration module 360. In some embodiments, server 220 also includes one or more hardware and/or software modules for performing specific steps and functions associated with the disclosed methods including, for example, camera arbitration module 360 that receives at least one camera feed via a wired or wireless link, and provides the at least one camera feed to processor 310. Server 220 can be a single server or can be configured as a distributed computer system including multiple servers or computers that interoperate to perform one or more of the processes and functionalities associated with the disclosed embodiments.

Processor 310 can be one or more processing devices configured to perform functions of the disclosed methods. Processor 310 can constitute a single core or multiple core processors executing parallel processes simultaneously. For example, processor 310 can be a single core processor configured with virtual processing technologies. In certain embodiments, processor 310 uses logical processors to simultaneously execute and control multiple processes. Processor 310 can implement virtual machine technologies, or other known technologies to provide the ability to execute, control, run, manipulate, store, etc. multiple software processes, applications, programs, etc. In another embodiment, processor 310 includes a multiple-core processor arrangement (e.g., dual, quad core, etc.) configured to provide parallel processing functionalities to allow server 220 to execute multiple processes simultaneously. As discussed in further detail below, processor 310 is specially configured with one or more applications and/or algorithms for performing method steps and functions of the disclosed embodiments. For example, processor 310 (and server 220) can be configured with hardware and/or software components that enable processor 310 to receive multiple simultaneous real-time camera feeds, analyze the camera feeds in real-time, select a camera feed with an optimal view of a participant, and provide the selected camera feed to one or more devices associated with a video conference. As another example, processor 310 (and server 220) can be configured with hardware and/or software components that enable processor 310 to determine an area of at least one participant, identify networked cameras associated with the determined area, and determine changes in the participant's area and/or networked cameras associated with the area. It is appreciated that other types of processor arrangements could be implemented that provide for the capabilities disclosed herein.

Memory 320 can be a volatile or non-volatile, magnetic, semiconductor, tape, optical, removable, non-removable, or other type of storage device or tangible and/or non-transitory computer-readable medium that stores one or more program(s) 330 such as server apps 332 and operating system 334, and data 340. Common forms of non-transitory storage media include, for example, a flash drive, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same.

Server 220 includes one or more storage devices configured to store information used by processor 310 (or other components) to perform certain functions related to the disclosed embodiments. For example, server 220 can include memory 320 that includes instructions to enable processor 310 to execute one or more applications, such as server applications 332, operating system 334, and any other type of application or software known to be available on computer systems. Alternatively or additionally, the instructions, application programs, etc. can be stored in an internal database 230 or external storage in direct communication with server 220 (not shown), such as one or more database or memory accessible over network 240.

Database 230 or other external storage can be a volatile or non-volatile, magnetic, semiconductor, tape, optical, removable, non-removable, or other type of storage device or tangible (i.e., non-transitory) computer-readable medium. Memory 320 and database 230 can include one or more memory devices that store data and instructions used to perform one or more features of the disclosed embodiments. Memory 320 and database 230 can also include any combination of one or more databases controlled by memory controller devices (e.g., server(s), etc.) or software, such as document management systems, Microsoft SQL databases, SharePoint databases, Oracle™ databases, Sybase™ databases, or other relational databases.

In some embodiments, server 220 is communicatively connected to one or more remote memory devices (e.g., physical remote databases or remote databases on a cloud storage system (not shown)) through network 240 or a different network. The remote memory devices can be configured to store information that server 220 can access and/or manage. By way of example, the remote memory devices could be document management systems, Microsoft SQL database, SharePoint databases, Oracle™ databases, Sybase™ databases, or other relational databases. Systems and methods consistent with disclosed embodiments, however, are not limited to separate databases or even to the use of a database.

Programs 330 include one or more software modules causing processor 310 to perform one or more functions of the disclosed embodiments. Moreover, processor 310 can execute one or more programs located remotely from account information display system 200. For example, server 220 can access one or more remote programs that, when executed, perform functions related to disclosed embodiments. In some embodiments, programs 330 stored in memory 320 and executed by processor(s) 310 can include one or more server app(s) 332 and operating system 334.

Server app(s) 332 can cause processor 310 to perform one or more functions of the disclosed methods. For example, server app(s) 332 cause processor 310 to determine and monitor one or more areas of one or more participants in a video conference, identify one or more networked cameras based on the determined area(s), receive information for the one or more networked cameras, receive real-time camera feeds from the identified cameras, analyze the received camera feeds using, for example, facial recognition methods, select a camera feed of the received camera feeds, and provide the selected camera feed to the video conference. Server app(s) 332 can include additional or fewer functions based on the configuration of system 200. In some embodiments other components of system 200 are configured to perform one or more functions of the disclosed methods. For example, video conference devices 254 can be configured to analyze received camera feeds, and select an optimal camera feed for display during the video conference.

In some embodiments, program(s) 330 include operating systems 334 that perform known operating system functions when executed by one or more processors such as processor 310. By way of example, operating systems 334 include Microsoft Windows™, Unix™, Linux™, Apple™ operating systems, Personal Digital Assistant (PDA) type operating systems, such as Microsoft CE™, or other types of operating systems 334. Accordingly, disclosed embodiments can operate and function with computer systems running any type of operating system 334. Server 220 can also include communication software that, when executed by a processor, provides communications with network 240, local network 242, and/or a direct connection to one or more camera device 210.

In some embodiments, data 340 include, for example, registration information for one or more camera devices 210 including, for example, identifying information of the owner or operator of the camera device, a geographic area of the camera device, specifications for the camera device such as video resolution, field of view angle, zoom capability, and preferences set by the owner and operator such as dates and times of camera availability, dates and times of restrictions, area restrictions, and other restrictions on recording and camera feed transmission.

Server 220 can also include one or more I/O devices 350 having one or more interfaces for receiving signals or input from devices and providing signals or output to one or more devices that allow data to be received and/or transmitted by server 220. For example, server 220 can include interface components for interfacing with one or more input devices, such as one or more keyboards, mouse devices, and the like, that enable server 220 to receive input from an operator or administrator (not shown).

In some embodiments, server 220 includes a camera arbitration module 360, comprising hardware and/or software components specifically configured for performing steps and functions of the disclosed methods. For example, camera arbitration module 360 can include one or more physical or virtual ports for connecting to one or more camera devices 210, for receiving camera feeds and for routing a selected camera feed to one or more devices associated with a video conference, such as conference bridge 254. Camera arbitration module 360 can also include one or more software modules or logic for switching between camera feeds, encoding and/or decoding camera feeds, and processing camera feeds in accordance with steps of the disclosed methods.

Figure 4:
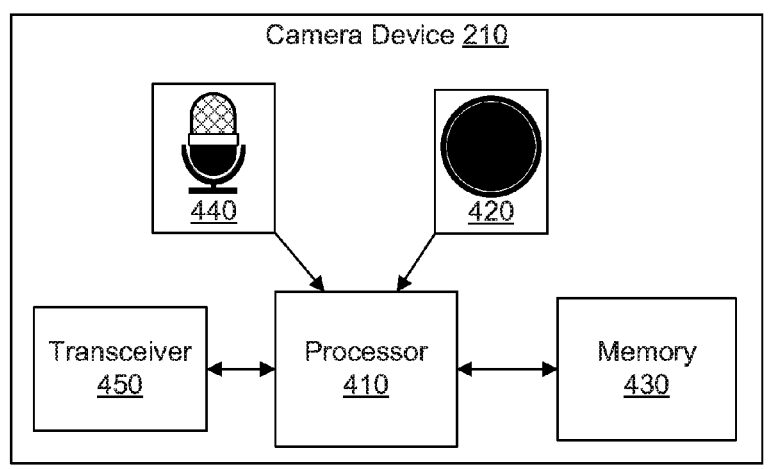
FIG. 4 is a component diagram of an example of a camera device, according to the disclosed embodiments.

FIG. 4 is a component diagram of an example of a camera device 210. Camera device 210 can be a standalone camera, or can be an electronic device having an embedded video camera. As shown, camera device 210 can include one or more processor 410, camera 420, memory 430, microphone 440, and transceiver 450. Camera device 210 can include additional or fewer components depending on the type of electronic device.

Processor 410 is one or more processing devices configured to perform functions of the disclosed methods, such as those discussed above with respect to processor 310. In some embodiments, processor 410 can be configured to execute computer instructions to receive instructions from server 220, capture video data, and transmit real-time captured video data to server 220.

Camera 420 includes one or more sensors for converting optical images to digital still image and/or video data. The one or more image sensors can include known sensors such as semiconductor charge-coupled devices (CCD), complementary metal-oxide-semiconductor (CMOS) devices, and other devices capable of providing image data to processor 410.

Memory 430 can be a volatile or non-volatile, magnetic, semiconductor, tape, optical, removable, non-removable, or other type of storage device or tangible (i.e., non-transitory) computer-readable medium that stores computer executable code such as firmware that causes processor 410 to perform one or more functions associated with image capture, data processing, data storage, transmitting data via transceiver 450, and receiving data via transceiver 450. In some embodiments, memory 430 can include one or more buffers for temporarily storing image data received from camera 420, before transmitting the image data as a camera feed to server 220.

Microphone 440 can include one or more sensor for converting acoustic waves proximate to camera device 210 to a stream of digital audio data. In some embodiments, camera device 210 transmits a camera feed to server 220 including video image and audio data, and in some embodiments camera device 210 transmits a camera feed including only video image data.

Transceiver 450 includes a wired or wireless communication module capable of sending and receiving data via network 240, local network 242, and/or other direct communication links with one or more components in system 200. In some embodiments, transceiver 450 can receive data from server 220 including instructions for processor 410 to activate camera 420 to capture video data, and for processor 410 to transmit a camera feed via transceiver 450. In response to the received instructions, transceiver can packetize and transmit a camera feed including audio and/or video image data to server 220.

Figure 5:
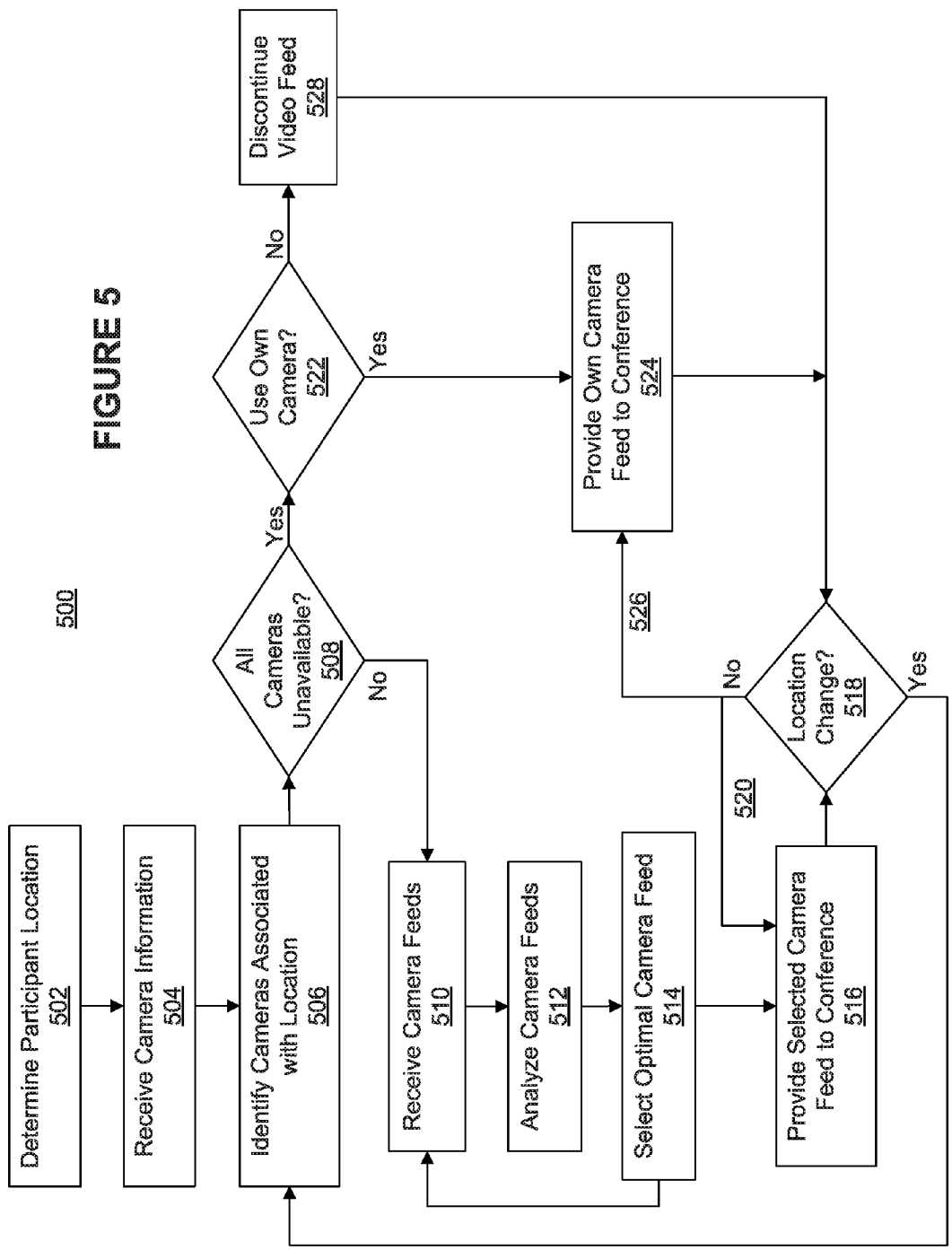
FIG. 5 is a flowchart of an example of a method for dynamically selecting cameras in a video conference, consistent with the disclosed embodiments.

FIG. 5 is a flowchart of a method 500 for dynamically selecting cameras in a video conference. Method 500 describes a process for determining a area of a conference participant such as participant 110, identifying networked cameras associated with the determined area, selecting a camera for providing a real-time camera feed to the conference, and dynamically changing camera feeds between cameras depending on the participant's area. In some embodiments, processor 310 can perform process 500 while a video conference is in progress between participant 110 and other participants 142a and 142b. In some embodiments, participant 110 can join the video conference by entering a passcode, credentials, or by facial recognition using a camera device 210. In some embodiments, processor 310 can perform method 500 for more than one participant in the video conference. Although certain steps of method 500 are described as being performed by the processor 310 of server 220, one or more processors other than processor 310 can perform one or more steps of method 500.

Method 500 can begin in step 502, where processor 310 determines a first area associated with a location of participant 110. In some embodiments, processor 310 determines an area using locating mechanisms such as GPS data, assisted GPS (A-GPS), cellular triangulation, or other known locating techniques. An area can comprise one or more of latitude and longitude coordinates, a street address, or an identification of a particular building or event. Processor 310 can receive raw data from a video conference device 254 associated with participant 110, and determine participant 110's area by analyzing the received raw data. In other embodiments, participant 110's video conference device 254 can determine its own area by processing raw data, and transmit the determined area to server 220.

In step 504, processor 310 receives camera information from one or more networked cameras, such as camera devices 210. In some embodiments, camera devices 210 are registered with server 220 during a registration process (not shown in figures) in which the owners and operators of each camera device 210 provide information about the camera device such as, for example, a network address, a location of the camera device 210, a type of device, and the device capabilities. During such a registration process, camera device 210 can transmit one or more signals via transceiver 450 for self-identifying and/or self-authenticating the camera device 210 with server 220, and for providing server 220 with a network and/or physical address of camera device 210. Owners and operators can also grant server 220 access to the camera device 210 to perform functions such as powering on, recording video, changing viewing angle, zooming, focusing, and providing a camera feed to server 220. During the registration process, the owners and operators can also provide information for one or more accounts, such as a financial account or a subscription service account. In such embodiments, the owners and operators are "subscribers" of a service in which their camera device 210 resources are leveraged in exchange for a form of financial compensation. For example, subscribers can receive compensation proportionate to the amount of time or the bandwidth usage while their camera device 210 provided a camera feed to one or more video conferences. In some embodiments, subscribers can receive compensation related to a quality of the camera device 210 location. For example, a a camera device 210 located in a busy urban location such as Times Square in New York City can be associated with a higher rate or amount of compensation, whereas a camera device 210 located in a quiet rural area can be associated with a relatively lower rate or amount of compensation. In some embodiments, subscribers can receive compensation proportionate to an amount of bandwidth used by the camera device 210 to provide camera feeds to server 220, whether or not server 220 selects the camera feed, to compensate the subscribers for their data usage associated with requests from server 220. In some embodiments, subscribers can receive compensation based on a total amount of revenue received from video conference participants over a predetermined time period, divided among a number of total subscribers. In some embodiments, different types of camera devices 210 can be associated with different compensation rates, based on the capabilities and video/audio quality of the camera device. Thus, some embodiments yield a financial gain for subscribers, in addition to providing enhancements in video conferencing technologies and better use of computing resources.

In some embodiments, database 230 can store camera information for one or more registered camera devices 210. In some embodiments, memory 320 can store camera information as data 340, or server 220 can access a remote storage location for camera information (not shown in figures).

In step 506, processor 310 identifies one or more cameras associated with participant 110's determined area. In some embodiments, processor 310 can scan the received camera location information to identify one or more camera devices 210 proximate to participant 110's area.

In some embodiments, processor 310 considers multiple factors when identifying camera devices 210 as potential candidates for camera feed analysis. For example, processor 310 can consider a sensor device 210 location and the zoom or resolution capabilities of the sensor device 210, to determine whether the camera device 210 may be considered "associated" with the area. A wearable camera 210a can have limited zoom and resolution capabilities, requiring the wearable camera 210a to be in close physical proximity to participant 110. A larger zoom surveillance camera, however, provides a sufficient view of participant 110 even from a great distance. As another example, an aircraft or satellite camera feed can contain a sufficient view of participant 110 from very far distances. Thus, in step 506 processor 310 can identify camera devices 210 that are physically proximate to participant 110's determined area, and camera devices 210 which are farther away but have greater zoom and resolution capabilities.

In step 508, processor 310 determines whether camera devices 210 are unavailable for the determined area. In some embodiments, step 508 is a simple determination of whether zero cameras were identified in step 506. For example, if participant 110 is located in a remote, unpopulated area, there may be no camera devices 210 proximate to participant 110 and no camera devices 210 with a sufficient view of participant 110 from a distance. As another example, camera devices 210 might be unavailable in an area where access to network 240 is limited or insufficient for transmitting a camera feed.

In some embodiments, step 508 comprises determining whether one or more camera devices 210 are unavailable due to privacy settings set by a network administrator or an owner and operator of camera device 210, or an indication from the network administrator or owner or operator of camera device 210 that a camera feed should not be provided to server 220 at the time server 220 inquires. For example, an owner and operator can include in their camera device 210 information stored as data 340 or in database 230 a restriction on providing camera feeds between the hours of 8:00 PM-6:00 AM, or a restriction on providing camera feeds when the camera device 210 is located in the owner and operator's residence or other designated location.

If at least one identified camera device 210 is available ("No" in step 508), then in step 510, processor 310 receives real-time camera feeds from the available identified camera devices 210. In some embodiments, processor 310 sends a request to each camera device 210 to begin transmitting a real-time camera feed to server 220. In some embodiments, processor 310 sends instructions to control a camera device 210 to power on the camera device, begin capturing real-time camera feed data, including video and/or audio data, and begin transmitting a camera feed comprising the real-time camera feed data.

In step 512, processor 310 analyzes received camera feeds, to identify a camera feed for providing to the video conference. Analysis can include, for example, video quality analysis and/or facial recognition analysis. In some embodiments, processor 310 analyzes each camera feed in real-time to identify a camera feed having a facial view of participant 110. In such embodiments, database 230 and/or memory 320 stores facial recognition data for participant 110, collected at a time prior to the conference. In some embodiments, participant 110 can provide facial recognition data through their own camera device upon registering with server 220, or upon beginning the video conference (steps not shown in figures). Thereafter, processor 310 can compare stored facial recognition data to the received camera feeds, to identify a camera feed with the optimal view of participant 110.

In some embodiments, processor 310 performs step 512 continuously during the video conference, even as a background operation, while performing other steps of method 500. Continuous camera feed analysis can ensure that the optimal view of participant 110 is provided to the video conference at all times.

In step 514, processor 310 can select an optimal camera feed having an optimal view, based on the analysis. As optimal view can comprise a camera feed with the clearest view of participant 110's face by including the most facial features of participant 110, and/or a camera feed with the largest image of participant 110's face. In some embodiments, the "optimal" camera feed comprises a camera feed with the clearest view of participant 110 relative to the other received camera feeds, based on a ranking of the camera feeds from the facial recognition analysis.

In some embodiments, the "optimal" camera feed comprises a camera feed that meets certain criteria and exceeds certain quality thresholds. For example, processor 310 can seek a camera feed in which participant 110's face fills a predetermined percentage of the image frame, indicative of a sufficiently close view of participant 110.

In some embodiments, processor 310 can send one or more instructions to identified camera devices 210 to change an optical focus of the image. For example, processor 310 can instruct the identified camera devices to scan through a focus range while analyzing received camera feeds. Processor 310 can employ one or more known image focus detection algorithms, such as contrast focus detection or phase focus detection, to control each camera device 210 and receive the sharpest possible images in the received camera feeds.

As shown in FIG. 5, processor 310 continuously loops steps 510, 512, and 514, to ensure the highest quality camera feed is provided to the video conference at all times. Thus, even once a first optimal camera feed is selected in step 514, another camera feed can later be identified as optimal, and can be selected as a second optimal camera feed to replace the first optimal camera feed in the video conference. In some embodiments, processor 310 can employ a predetermined time delay before selecting a different optimal camera feed, to prevent switching between camera feeds too rapidly.

In step 516, processor 310 provides the selected camera feed to the video conference. In some embodiments, processor 310 forwards the camera feed to conference bridge 252 for distribution to video conference devices 254. In other embodiments, processor 310 distributes the camera feed directly to video conference devices 254.

In step 518, processor 310 can determine whether participant 110's area has changed. In some embodiments, processor 310 determines participant 110's current area, compare the current area against the first area determined in step 502, and determine that participant 110's location has changed when the difference between areas exceeds a predetermined threshold. In other embodiments, processor 310 identifies any change in participant 110's coordinates or address as an area change.

If participant 110's area has changed ("Yes" in step 518), then method 500 returns to step 506, to identify camera devices 210 associated with participant 110's new area. Some previously-identified camera devices 210 can remain in the group of identified cameras, such as when participant 110 moves only slightly, or when the camera device 210 moves with participant 110. Thereafter, method 500 continues to step 508 with the new or modified set of identified camera devices 210.

Returning to step 518, if participant 110's area has not changed more than a predefined threshold ("No" in step 518), processor 310 continues providing the selected camera feed to the video conference, returning to step 516 via path 520.

Returning to step 508, if no cameras are associated with participant 110's location, or none of the identified camera devices are available ("Yes" in step 508), then in step 522 processor 310 determines whether to utilize a camera feed from participant 110's own camera device 210 and/or video conferencing device 254. In some embodiments, participant 110 provides one or more preference settings to server 220, such as indicating whether participant 110 prefers to use their own camera feed when other camera devices 210 are unavailable, or whether no video feed should be used when camera devices 210 are unavailable. In some embodiments, processor 310 sends a notification to participant 110's video conference device 254, informing participant 110 that camera devices 210 are unavailable in participant 110's current area, and inquiring whether participant 110's own camera feed should be provided to the video conference (step not shown).

If participant 110's own camera feed should not be used ("No" in step 522), then in step 528 processor 310 can discontinue providing any camera feed of participant 110 to the video conference. In some embodiments, processor 310 can inform participant 110 that the camera feed is discontinued, and instruct participant 110 to change their area to reinstate the camera feed. Processor 310 can continue monitoring participant 110's area for changes (step 518), until participant 110 changes area and processor 310 can identify a new set of camera devices 210 ("Yes" in step 518).

Returning to step 522, if processor 310 determines that participant 110's own camera should be used ("Yes" in step 522), based on personal preferences or an instruction received from participant 110, then processor 310 can begin receiving a real-time camera feed from one or more camera devices 210 associated with participant 110, and provide the camera feed to the video conference (step 524).

Processor 310 can continue monitoring participant 110's area for changes (step 518). If participant 110's area has not changed ("No" in step 518), then processor 310 continues providing participant 110's own camera feed to the video conference, returning to step 524 via path 526. If participant 110's area has changed ("Yes" in step 518), then method 500 returns to step 506 to identify cameras associated with the new area.

In some embodiments, processor 310 continues searching for camera devices 210 associated with participant 110's area when using participant 110's own camera feed. If processor 310 identifies an available camera device 210 associated with participant 110's area, processor 310 automatically provides a camera feed from the camera device 210 to the video conference, thereby discontinuing the camera feed from participant 110's own camera (step not shown). In some embodiments, processor 310 sends one or more inquiries to participant 110 via video conference device 254, to determine whether participant 110 wishes to continue using their own camera feed, and ignores camera feeds from other camera devices 210 (steps not shown). Method 500 can continue until the video conference ends or until participant 110 and/or other participants 142a and 142b instruct server 220 to discontinue the video portion of the conference, at which point method 500 ends (steps not shown in figure).

Figure 6:
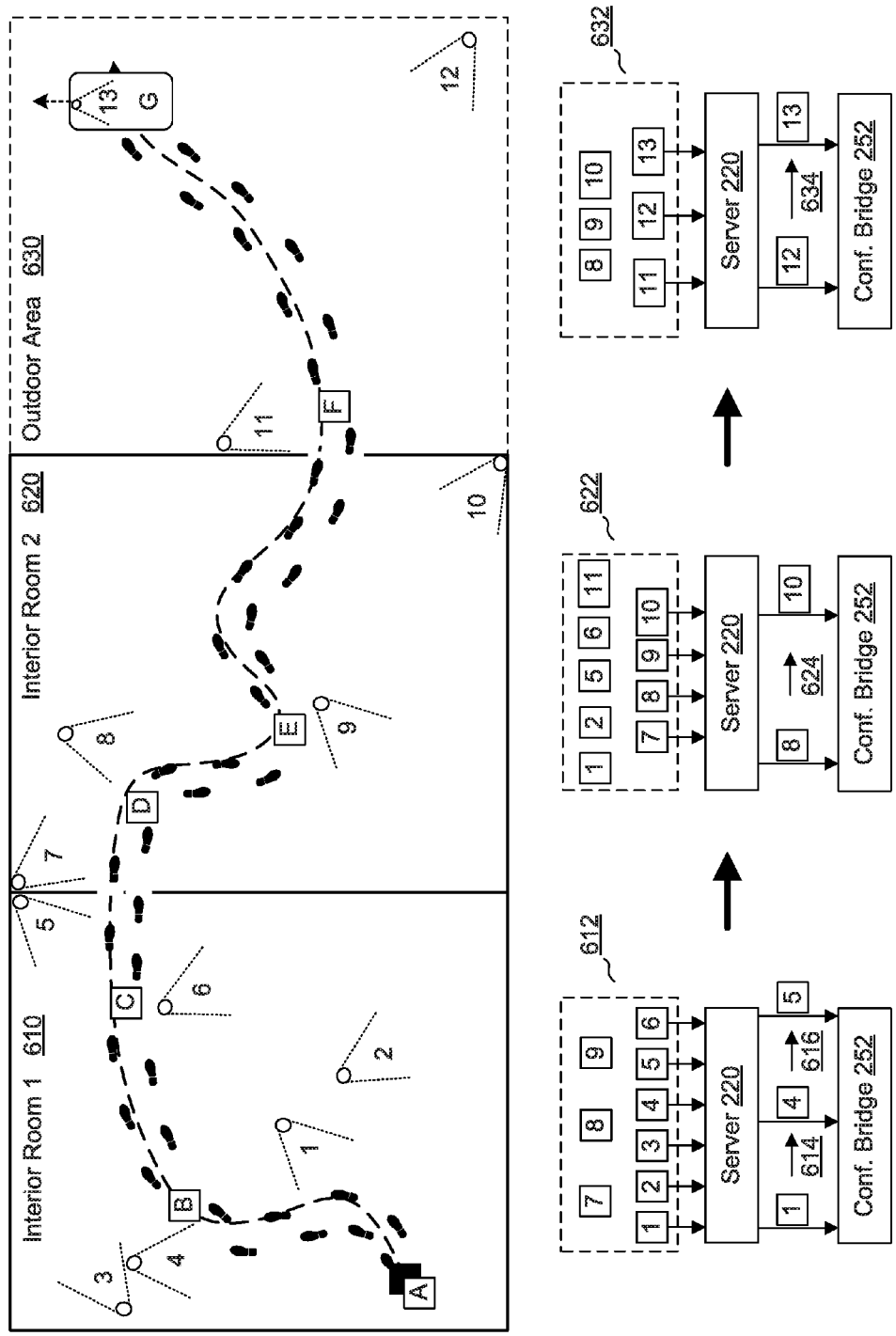
FIG. 6 is an illustration of an example use scenario of the disclosed embodiments.

FIG. 6 is an illustration of a scenario using the disclosed embodiments. In FIG. 6, a walking path of participant 110 is shown, as participant 110 walks throughout interior room 1 610 and interior room 2 620, and into outdoor area 630. Participant 110 can participate in a video conference while traversing the walking path, and server 220 can analyze camera feeds from one or more camera feeds 1-13 from associated camera devices in FIG. 6. Camera devices associated with each of camera feeds 1-13 are represented by a small circle, and dashed lines adjacent to each camera device circle indicates a field of view of each respective camera feed 1-13.

Participant 110 begins standing at position A in interior room 1 610. Processor 310 can determine participant 110's area at position A, and identify camera devices associated with position A, resulting in first camera device set 612. First camera feed set 612 includes camera feeds 1, 2, 3, 4, 5, 6, 7, 8, and 9. As shown, the camera devices 210 of first camera feed set 612 are located proximate to position A. Server 220 can receive real-time camera feeds 1, 2, 3, 4, 5, 6, 7, 8, and 9, and analyze the received camera feeds to select an optimal camera feed having the optimal view of participant 110. As shown in FIG. 6, server 220 determines whether participant 110 is within the field of view of one or more camera devices 210, and then determines which of the camera devices 210 provides an optimal view. For example, participant 110 is within camera feed 1's field of view when standing at position A. Although a camera device providing camera feed 2 may be the same distance or closer to participant 110, camera feed 2 does not contain participant 110 within its field of view, and thus camera feed 2 does not contain an optimal view of participant 110. Furthermore, camera feed 4 may not provide an optimal view of participant 110, even though participant 110 may be within camera feed 4's field of view. Therefore, processor 310 can select a camera feed from camera feed 1 as the optimal camera feed, and provide the camera feed to the video conference such as by forwarding the camera feed to conference bridge 252.

In some embodiments, processor 310 can determine that participant 110 is within a camera device 210's field of view based on a reflection or mirror image of participant 110. For example, if participant 110 is located behind a camera device 210 or otherwise out of the camera device 210's field of view, a mirror or window located within camera device 210's field of view can provide camera device 210 with a reflection and/or reflection of participant 210. In some embodiments, processor 310 selects a camera feed having a reflection or mirror image of participant 110, when the camera feed is deemed "optimal" in comparison to other received camera feeds.

As participant 110 walks through interior room 1 610 toward position B, processor 310 determines through continuous camera feed analysis that camera feed 4 includes a better view of participant 110. Processor 310 can identify camera feed 4 as an optimal camera feed, and dynamically switch the camera feed provided to conference bridge 252 to camera feed 4, as shown by transition 614.

Participant 110 then proceeds to walk toward position C, and processor 310 identifies camera feed 5 as providing an optimal view of participant 110. Thus, near position C, server 220 can dynamically switch the provided camera feed from camera feed 4 to camera feed 5, as shown by transition 616. Notably, a camera device providing camera feed 6 may be located closest to participant 110 at position C, but camera feed 6 may not include any view of participant 110. As discussed herein, selection of an optimal camera feed may depend on multiple factors such as proximity between participant 110 and the camera device 210, a video quality of the camera feed, and a facial recognition analysis to identify the optimal view of participant 110.

Participant 110 continues walking from interior room 1 610 into interior room 2 620, and processor 310 determines that participant 110's area has changed significantly, requiring a new identification of camera devices 210 associated with participant 110's new area. Processor 310 can identify second camera feed set 622, including camera feeds 1, 2, 5, 6, 7, 8, 9, 10, and 11 as associated with participant 110's new area, and server 220 may receive camera feeds 1, 2, 5, 6, 7, 8, 9, 10, and 11. Camera devices associated with camera feeds 3 and 4 are deemed too far from participant 110 for inclusion in second camera feed set 622, especially when processor 310 determines that, based on the capabilities indicated in the stored camera device information, that camera feeds 3 and 4 do not provide a wide-angle or zoom view.

In some embodiments, processor 310 can also identify one or more intermediate camera feed sets in between 612 and 622, by identifying camera devices 210 associated with intermediate participant 110 areas, such as position B and/or position D (extra camera feed sets not shown in figures).

After participant 110 enters interior room 2 620, processor 310 can dynamically switch camera feeds provided to conference bridge 252, from camera feed 5 to camera feed 8. As shown in FIG. 6, camera feed 8 provides the optimal view of participant 110 at position D. Although participant 110 walks through a field of view of camera feed 7, the camera feed may not include a sufficient view of participant 110's face, and may only include side and posterior views of participant 110, whereas camera feed 8 may provide a view of participant 110's face.

As participant 110 walks toward position E, camera feed 8 may include a progressively poorer view of participant 110. Processor 310 can also determine that camera feed 9 does not include a view of participant 110's face, but that camera feed 10 provides the optimal view of participant 110. Camera feed 10 may include a zoomed-view of participant 110, such as when camera feed 10 is provided by a fixed surveillance camera. In some embodiments, processor 310 sends instructions to a camera device 210 providing camera feed 10, to zoom-in the camera feed image, or to rotate the camera device 210. Some camera devices 210 can allow processor 310 to control aspects of the camera device 210, however some camera devices such as wearable cameras 210a may not receive or process instructions to rotate the camera or zoom the camera feed image.

Participant 110 exits interior room 2 620, and enters outdoor area 630, prompting processor 310 to identify a new or modified set of associated camera devices 210. Processor 310 then identifies third camera feed set 630 including, for example, camera feeds 8, 9, 10, 11, 12, and 13. Upon arriving at position F, processor 310 can determine that camera feed 12 includes an optimal view of participant 110. In some embodiments, camera feed 12 may be provided by a security camera, surveillance camera, wearable camera, an aircraft, blimp, or satellite. Server 220 can dynamically switch the camera feed provided to conference bridge 252 from camera feed 10 to camera feed 12. In some embodiments, processor 310 can select camera feed 11 as an optimal feed, if camera feed 12 contains only a very small, distant view of participant 110 (not illustrated in figures). Alternatively, if processor 310 determines that neither camera feeds 11 nor camera feed 12 provides a sufficient view of participant 110, processor 310 can decide whether to use participant 110's own camera feed, or to discontinue providing a camera feed for participant 110 to the video conference.

As participant 110 approaches position G, processor 310 can predict that participant 110 is walking toward position G and will soon be within view in camera feed 13. For example, processor 310 can determine that participant is traveling toward a dash camera installed in participant 110's car and providing camera feed 13. Processor 310 can estimate participant 110's arrival based on participant 110's walking speed, direction, historical movement patterns, and distance from position G. Prior to reaching position G, server 220 may switch the camera feed provided to conference bridge 252 from camera feed 12 to camera feed 13 in transition 634. Once at position G, participant 110 might drive away in his car while continuing the video conference with camera feed 13. Processor 310 can continue monitoring participant 110's area changes, but may continue using camera feed 13 because the associated dash camera is installed in participant 110's car and moving with participant 110. In some embodiments, processor 310 can continue determining participant 110's area, identifying associated camera devices 210, and providing camera feeds until the video conference ends or until participant 110 and/or other participants 142a and 142b instruct server 220 to discontinue the video portion of the conference (steps not shown in figure).

In some embodiments, processor 310 (and/or an external system associated with server 220) can determine an amount to compensate subscribers (owners and operators) for using their camera devices 210 for video conferences (not shown in figures). In such embodiments, processor 310 can calculate a length of time during which server 220 receives a camera feed from the subscriber's camera device 210 for analysis, and/or a length of time during which server 220 provides the subscriber's camera device 210 camera feed to the video conference. In some embodiments, processor 310 can determine an amount to compensate subscribers for making their camera devices 210 available for use by server 220, even if processor 310 does not receive a camera feed from the camera device 210. Processor 310 can generate information regarding the determined amount of compensation, such as a monetary amount and a financial account associated with a subscriber for depositing the monetary amount. In some embodiments, compensation may be provided in the form of an account credit for a service associated with or partnered with server 220. By compensating subscribers (owners and operators) for leveraging their camera devices 210, processor 310 has access to many camera devices 210 to provide a continuous stream of clear images of participant 110, thereby increasing the quality of the video conference, and utilizing otherwise underused cameras throughout public and private environments.

Those skilled in the relevant arts would recognize that the dynamic networked camera selection methods and systems described herein could be used for purposes other than providing video feeds to conference calls. For example, the dynamic networked camera selection could be used in conjunction with security systems or surveillance systems, or for selecting cameras to provide camera feeds of an individual for a broadcast presentation of an event.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented as hardware alone.

Computer programs based on the written description and methods of this specification are within the skill of a software developer. The various programs or program modules can be created using a variety of programming techniques. For example, program sections or program modules can be designed in or by means of Java, C, C++, assembly language, or any such programming languages. One or more of such software sections or modules can be integrated into a computer system, non-transitory computer-readable media, or existing communications software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as non-limiting, with a true scope and spirit being indicated by the following claims and their full scope of equivalents.

What is claimed is:

1. A computer-implemented method for selecting a camera feed for a participant in a video conference, the method comprising:
   determining a first area of the participant;
   identifying, from a plurality of cameras associated with a plurality of subscribers, a first set of cameras associated with the first area;
   analyzing a first plurality of real-time camera feeds from the first set of cameras; and
   automatically selecting, by one or more processors and based on the analysis, a first camera feed of the first plurality of real-time camera feeds, the selected first camera feed containing a view of the participant.

2. The method of claim 1, further comprising:
   providing the first camera feed to the video conference, wherein the plurality of real-time camera feeds include at least one of video or audio feeds.

3. The method of claim 2, further comprising:
   automatically selecting, based on the analysis, a second camera feed of the first plurality of real-time camera feeds if the second camera feed contains a better view of the participant than the first camera feed; and
   automatically providing the second camera feed to the video conference in place of the first camera feed.

4. The method of claim 1, further comprising:
   receiving registration information for the plurality of cameras associated with the plurality of subscribers, wherein the registration information indicates a permission granted by the plurality of subscribers to access real-time camera feeds of the plurality of video cameras.

5. The method of claim 1, wherein analyzing includes performing a facial recognition analysis to select an optimal view of the participant compared to the first plurality of real-time camera feeds.

6. The method of claim 1, further comprising:
determining a second area of the participant different than the first area;
identifying, from the plurality of cameras, a second set of cameras proximate the second area;
analyzing a second plurality of real-time camera feeds from the second set of cameras;
selecting, based on the analysis, a second camera feed containing a view of the participant of the second plurality of real-time camera feeds; and
automatically providing the second camera feed to the video conference in place of the first camera feed.

7. The method of claim 1, wherein the plurality of cameras include one or more of a wearable camera, a fixed camera, a vehicle camera, or a mobile device camera.

8. The method of claim 1, wherein the first area of the participant is determined using a locating mechanism associated with the participant.

9. A system for selecting a camera feed for a participant in a video conference, the system comprising:
one or more memories having stored thereon computer-executable instructions; and
one or more processors configured to execute the stored instructions to:
determine a first area of the participant;
identify, from a plurality of cameras associated with a plurality of subscribers, a first set of cameras associated with the first area;
analyze a first plurality of real-time camera feeds from the first set of cameras; and
automatically select, by the one or more processors and based on the analysis, a first camera feed of the first plurality of real-time camera feeds, the selected first camera feed containing a view of the participant.

10. The system of claim 9, wherein the one or more processors are further configured to execute the stored instructions to:
provide the first camera feed to the video conference, wherein the plurality of real-time camera feeds include at least one of video or audio feeds.

11. The system of claim 10, wherein the one or more processors are further configured to execute the stored instructions to:
automatically select, based on the analysis, a second camera feed of the first plurality of real-time camera feeds if the second camera feed contains a better view of the participant than the first camera feed; and
automatically provide the second camera feed to the video conference in place of the first camera feed.

12. The system of claim 9, wherein the one or more processors are further configured to execute the stored instructions to:
receive registration information for the plurality of cameras associated with the plurality of subscribers, wherein the registration information indicates a permission granted by the plurality of subscribers to access real-time camera feeds of the plurality of video cameras.

13. The system of claim 9, wherein the one or more processors are configured to analyze the first plurality of real-time camera feeds by performing a recognition analysis to select a camera feed having an optimal view of the participant compared to the first plurality of real-time camera feeds.

14. The system of claim 9, wherein the one or more processors are further configured to execute the stored instructions to:
determine a second area of the participant different than the first area;
identify, from the plurality of cameras, a second set of cameras proximate the second area;
analyze a second plurality of real-time camera feeds from the second set of cameras;
select, based on the analysis, a second camera feed containing a view of the participant of the second plurality of real-time camera feeds; and
automatically provide the second camera feed to the video conference in place of the first camera feed.

15. A non-transitory computer-readable medium storing instructions that are executable by one or more processors to cause the one or more processors to perform a method for selecting a camera feed for a participant in a video conference, the method comprising:
determining a first area of the participant;
identifying, from a plurality of cameras associated with a plurality of subscribers, a first set of cameras associated with the first area;
analyzing a first plurality of real-time camera feeds from the first set of cameras; and
automatically selecting, by the one or more processors and based on the analysis, a first camera feed of the first plurality of real-time camera feeds, the selected first camera feed containing a view of the participant.

16. The non-transitory computer-readable medium of claim 15, wherein the set of instructions that are executable by the one or more processors to cause the one or more processors to further perform:
providing the first camera feed to the video conference, wherein the plurality of real-time camera feeds include at least one of video or audio feeds.

17. The non-transitory computer-readable medium of claim 16, wherein the set of instructions that are executable by the one or more processors to cause the one or more processors to further perform:
automatically selecting, based on the analysis, a second camera feed of the first plurality of real-time camera feeds if the second camera-feed contains a better view of the participant than the first camera feed; and
automatically providing the second camera feed to the video conference in place of the first camera feed.

18. The non-transitory computer-readable medium of claim 15, wherein the set of instructions that are executable by the one or more processors to cause the one or more processors to further perform:
receiving registration information for the plurality of cameras associated with the plurality of subscribers, wherein the registration information indicates a permission granted by the plurality of subscribers to access real-time camera feeds of the plurality of video cameras.

19. The non-transitory computer-readable medium of claim 15, wherein analyzing includes performing a recognition analysis to select a camera feed having an optimal view of the participant compared to the first plurality of real-time camera feeds.

20. The non-transitory computer-readable medium of claim 15, wherein the set of instructions that are executable by the one or more processors to cause the one or more processors to further perform:
- determining a second area of the participant different than the first area;
- identifying, from the plurality of cameras, a second set of cameras proximate to the second area;
- analyzing a second plurality of real-time camera feeds from the second set of cameras;
- selecting, based on the analysis, a second video camera containing a view of the participant of the second plurality of real-time camera feeds; and
- automatically providing the second camera feed to the video conference in place of the first camera feed.

* * * * *